United States Patent [19]
Higuchi et al.

[11] 3,893,883
[45] July 8, 1975

[54] HEAT BONDABLE SHEET MATERIALS
[75] Inventors: Takashi Higuchi, Hikone; Katsuyoshi Yamauchi, Moriyama, both of Japan
[73] Assignee: Firma Carl Freudenberg, Weinheim an der Bergstrasse, Germany
[22] Filed: Feb. 16, 1973
[21] Appl. No.: 333,255

[30] Foreign Application Priority Data
Feb. 25, 1972  Germany............................ 2208976

[52] U.S. Cl. ................... 156/334; 2/243 A; 161/89; 161/148; 161/247; 260/27 R
[51] Int. Cl. ............................................. C09j 7/00
[58] Field of Search ............... 161/88, 89, 148, 247; 260/27 R, 29.8; 2/243 A; 117/161 UZ; 156/334

[56] References Cited
UNITED STATES PATENTS

| | | | |
|---|---|---|---|
| 2,894,925 | 7/1959 | Morris et al. | 260/27 R |
| 3,098,235 | 7/1963 | Gusman | 161/148 |
| 3,442,736 | 5/1969 | Duns | 161/148 |
| 3,470,145 | 9/1969 | Lipman | 260/27 R |
| 3,663,488 | 5/1972 | Kail | 260/27 R |

*Primary Examiner*—George F. Lesmes
*Assistant Examiner*—James J. Bell
*Attorney, Agent, or Firm*—Burgess, Dinklage & Sprung

[57]       ABSTRACT

A heat-bondable sheet material comprising a support carrying about 5 to 100 g/m$^2$ of an adhesive composition comprising 100 parts by weight of polyethylene having a melt index of about 0.2 to 50 and a molecular weight of at least about 22,000, per about 5 to 45 parts by weight of a terpene resin having a softening point of about 60° to 120°C. The support is generally a textile fabric and the product can be bonded to a fabric as a lining or interlining merely by ironing with a flatiron, being securely attached so as to withstand laundering and dry cleaning.

1 Claim, No Drawings

HEAT BONDABLE SHEET MATERIALS

The invention relates to heat-bonding sheet materials, especially iron-in or iron-on fibrous stiffening materials for articles of clothing.

The manufacture of iron-in interfacing materials is described in German Auslegeschrift No. 1,096,324. This patent mentions, among other things, the use of polyethylene as adhesive. However, polyethylene resins provide a satisfactory bond between the face material and the interfacing only when a polyethylene is used having a melt index of more than 70. The iron-on temperature in that event is relatively high. Another disadvantage is that an article of clothing stiffened with a stiffening material coated with polyethylene has very little ability to withstand washing. Its ability to withstand chemical cleaning agents is still poorer.

It was first attempted to overcome these disadvantages using a mixture of polyethylene with low-molecular waxes, polybutene, petroleum resin, xylene resin, paraffin chloride, etc. The results, however, were not satisfactory.

It is accordingly an object of the invention to provide a stiffening insert which is coated with an adhesive, which can be ironed on at low temperatures and will neverthless have a good ability to withstand cleaning.

These and other objects and advantages are realized in accordance with the present invention pursuant to which there is provided a heat-bondable sheet material comprising a support carrying about 5 to 100 g/m² of an adhesive composition comprising 100 parts by weight of polyethylene having a melt index of about 0.2 to 50 and a molecular weight of at least about 22,000, per about 5 to 45 parts by weight of a terpene resin having a softening point of about 60° to 120°C.

The polyethylene component of the adhesive composition cannot be used alone because of its excessively high melting point. Only through the admixture of the specified terpene resins in certain amounts is the melting point lowered while at the same time the ability to withstand washing and chemical cleaning is improved. The greatest ability to withstand chemical cleaning is achieved by using a polyethylene with a melt index under about 30 and a molecular weight over about 25,000.

A suitable terpene resin is pinene, particularly β-pinene with a softening point of about 60° to 120°C. Terpene resins with a higher softening point do not bring about a sufficient lowering of the melting point of the adhesive mixture of polyethylene and terpene. On the other hand, if terpene resins with a softening point below about 60°C are used, no improvement of the adhesive power is achieved. The most suitable terpene resins are those with a softening point between about 80° and 110°C.

As stated above, the polyethylene and the terpene resin must be mixed in a certain ratio. If less than about 5 parts by weight of terpene resin are added per 100 parts of polyethylene, no appreciable melting point reduction of the polyethylene is realized. The bonding strength therefore remains low. If more than about 45 parts of terpene resin are added, the viscosity of the mixture becomes too low so that it strikes through both the facing and the interfacing, and this, too, must be prevented. The best ratio is 100 parts of polyethylene and about 10 to 35 parts of terpene resin.

The adhesive composition may consist solely of the two above-named components, i.e., polyethylene and terpene resin, or if necessary or desired, additional substances such as dyes, pigments, fillers, stabilizers, etc., may be added.

The mixing of the two resins may be performed by any known method. They may thus be mixed in the molten state, or they may be dispersed or dissolved together or used together in paste form. The adhesive composition of the invention may be spread, printed or sprayed onto the surface of a support in the form of solutions or dispersions. However, it may also be sprinkled on in the form of a powder and the particles may be sintered together. Lastly, it is also possible to transform the adhesive composition into fibers or films and to use them for coating the support. The quantity of coating composition in use usually ranges from about 15 to 40 grams per square meter. Only when very thin stiffening inserts are used will the quantity be diminished to about 5 to 15 g/m². If a thicker support is used, however, such as linen or tent cloth, larger amounts of adhesive will be applied, e.g. about 40 to 80 g/m², particularly if the surface of the material to be stiffened is uneven.

Interfacing materials onto which the new adhesive compound may be applied include woven, non-woven and knit textile fabrics as well as other sheet materials. The support may also constitute such materials.

An iron-on interfacing manufactured in accordance with the invention may be firmly bonded to the face material within 5 to 10 seconds at a temperature of about 120° to 160°C and a pressure of about 0.15 to 35 kg/m². These conditions are easily achieved by ironing with an ordinary flatiron.

Since the interfacings of the invention have excellent ability to withstand washing and dry-cleaning they can be used in the garment industry. However, they may also be laminated with or ironed onto other materials such as glass, wood, metal, plastic, paper, rubber, etc. The iron-on sheet materials of the invention may also be used as wall coverings and furniture covering materials.

The invention will be further described in the following illustrative examples wherein all parts are by weight unless otherwise expressed. In the examples, the following types of polyethylene resin were used: Milason, of Mitsui Polychemical; M 16, M 10 and Sumicasen G-806 of Sumitomo Kagaku, and Frosen M 5003 of Seitetsu Kagaku. The following types of terpene resin were used: YS Resin No. 200 (molecular weight approximately 500), No. 400, 600, 800, 1000 (molecular weight approximately 1000), and No. 1150 (molecular weight approximately 1200) of the firm of Yasuhara Yushi.

EXAMPLES 1–21

Polyethylene resin and polyterpene resin are mixed in the ratios listed in Table 1 below. Then the mixture is melted at 170°C and pellets of a diameter of 3mm are extruded by means of a pelletizer. These are then ground up and sifted through a sieve (grit size 35). This powder is then sprinkled in a quantity of 25 g/m² onto a non-woven fabric sold under the trademark Vilene CX-3 and formed of textile staple fibers, having a weight of 50 g/m² and a thickness of 0.31 mm. Then the particles are sintered into the surface in an oven for 60 seconds. The adhesive strength of the iron-on interfacing thus prepared is determined as follows:

The various iron-on materials are laid onto a "Tropical" fabric weighing 170 g/m², and woven of a 50-50 blend of polyester and wool. The bonding is performed in an electrical ironing machine at temperature of about 150°C and at a pressure of 0.2 kg/cm² for a period of 5 seconds. These conditions correspond to ironing with a flatiron. From the sandwiches thus bonded together strips having a width of 5cm are cut and the bond strength is measured, using strips in which about 2 cm of the length at one end has not yet been bonded.

The two unbonded ends are clamped in a tear strength tester. The tearing force can then be varied, and the weight at which delamination occurs is the so-called bond strength.

The so-called initial bond strength was measured 24 hours after the ironing operation. The bond strength after chemical cleaning was measured in each case on specimens which were ironed at 160°C and cleaned 5 times with perchlorethylene at intervals of 10 minutes. The symbol * in the table signifies that the interfacing tore apart before the pulling began. If the bond strength of a strip 5 cm wide is more than 0.5 kg, this signifies a perfect bond and excellent stability after chemical cleaning.

Test numbers 4, 9 and 14 to 21 in Table 1 refer to specimens not in accordance with the invention. All other test numbers refer to specimens of the invention.

Table 1

| Ex. No. | Polyethylene Melt index | Polyethylene Molecular weight M.W. | Softening point terpene, °C | Weight Ratio polyethylene to terpene | Initial bond strength kg/5 cm 140°C/160°C | | Bond strength after dry cleaning kg/5 cm |
|---|---|---|---|---|---|---|---|
| 1 | 3.7 | 32000 | 100 | 70/30 | 0.60 | *1.02 | 0.75 |
| 2 | 3.7 | 32000 | 100 | 75/25 | 0.50 | *1.05 | 0.92 |
| 3 | 3.7 | 32000 | 100 | 80/20 | 0.45 | 0.92 | 0.95 |
| 4 | 3.7 | 32000 | — | 100/0 | 0.03 | 0.15 | pulled off completely |
| 5 | 23 | 27000 | 100 | 75/25 | 1.11 | *1.25 | 0.95 |
| 6 | 23 | 27000 | 100 | 80/20 | 1.04 | *1.12 | 1.01 |
| 7 | 23 | 27000 | 100 | 85/15 | 0.81 | *1.09 | 1.05 |
| 8 | 23 | 27000 | 100 | 90/10 | 0.61 | 0.80 | 0.75 |
| 9 | 23 | 27000 | — | 100/0 | 0.20 | 0.35 | pulled off completely |
| 10 | 50 | 23000 | 100 | 80/20 | 0.95 | 0.94 | 0.65 |
| 11 | 50 | 23000 | 100 | 85/15 | 0.95 | 0.93 | 0.70 |
| 12 | 50 | 23000 | 100 | 90/10 | 0.66 | 0.80 | 0.72 |
| 13 | 50 | 23000 | 100 | 95/5 | 0.46 | 0.70 | 0.62 |
| 14 | 50 | 23000 | — | 100/0 | 0.25 | 0.38 | pulled off completely |
| 15 | 70 | 21000 | 100 | 80/20 | 0.68 | 0.65 | ″ |
| 16 | 70 | 21000 | 100 | 85/15 | 0.60 | 0.75 | ″ |
| 17 | 70 | 21000 | 100 | 90/10 | 0.52 | 0.72 | ″ |
| 18 | 70 | 21000 | 100 | 96/5 | 0.40 | 0.60 | ″ |
| 19 | 70 | 21000 | — | 100/0 | 0.20 | 0.39 | ″ |
| 20 | 80 | 21000 | — | 100/0 | 0.15 | 0.45 | ″ |
| 21 | 100 | 21000 | — | 100/0 | 0.20 | 0.50 | ″ |

EXAMPLES 22–46

The adhesive compounds listed in Table 2 are applied to a non-woven fabric support in the manner described in Examples 1–21. The support is Vilene 345 non-woven fabric of 0.68 mm thickness. The interfacings made with the various adhesive compounds are laid on the same Tropical fabric as in Examples 1–21. The two materials are pressed with an electric ironing machine at a temperature of 150°C and a pressure of 0.3 kg/m². The ironing time is 10 sec. The testing of the bond strength is performed as in Examples 1–21. The symbol Δ in Table 2 identifies specimens not made in accordance with the invention, which were also tested for comparison.

Table 2

| Test No. | Polyethylene melt index | Polyethylene Molecular weight | Softening point °C of terpene | Ratio of polyethylene to terpene by wt. | Initial bond strength kg/5 cm | Bond strength after chemical cleanings kg/5cm |
|---|---|---|---|---|---|---|
| Δ 22 | 3.7 | 32000 | 40 | 60/40 | 1.54 | 0.43 |
| Δ23 | 3.7 | 32000 | 40 | 85/15 | 1.20 | 0.45 |
| 24 | 3.7 | 32000 | 100 | 85/15 | 3.15 | 1.15 |
| 25 | 3.7 | 32000 | 100 | 90/10 | 2.50 | 1.10 |
| 26 | 3.7 | 32000 | 100 | 95/5 | 0.94 | 0.75 |
| Δ27 | 3.7 | 32000 | 115 | 60/40 | 3.28 | 0.49 |
| 28 | 3.7 | 32000 | 115 | 85/15 | 2.79 | 1.09 |
| Δ 29 | 12 | 30000 | 20 | 90/10 | 1.23 | 0.42 |
| Δ 30 | 12 | 30000 | 40 | 90/10 | 1.27 | 0.44 |
| 31 | 12 | 30000 | 60 | 90/10 | 1.43 | 0.70 |
| 32 | 12 | 30000 | 80 | 90/10 | 2.37 | 0.90 |
| Δ 33 | 12 | 30000 | 100 | 60/40 | 1.40 | 0.43 |
| 34 | 12 | 30000 | 100 | 85/15 | 2.95 | 1.17 |
| 35 | 12 | 30000 | 100 | 90/10 | 2.85 | 1.13 |
| 36 | 12 | 30000 | 100 | 95/5 | 1.30 | 0.95 |
| 37 | 12 | 30000 | 115 | 90/10 | 2.94 | 1.00 |
| Δ 39 | 12 | 30000 | — | 100/0 | 0.96 | — |
| 39 | 23 | 27000 | 100 | 85/15 | 1.92 | 1.00 |
| 40 | 23 | 27000 | 100 | 90/10 | 2.53 | 1.14 |
| Δ41 | 50 | 23000 | 40 | 60/40 | 0.23 | — |
| Δ42 | 50 | 23000 | 40 | 85/15 | 0.74 | — |
| 43 | 50 | 23000 | 100 | 90/10 | 1.30 | 0.70 |
| 44 | 50 | 23000 | 100 | 95/5 | 1.20 | 0.71 |
| Δ45 | 50 | 23000 | 115 | 60/40 | 0.62 | — |
| 46 | 50 | 23000 | 115 | 85/15 | 1.66 | 0.65 |

It will be appreciated that the instant specification and examples are set forth by way of illustration and not limitation, and that various modifications and changes may be made without departing from the spirit and scope of the present invention:

What is claimed is:

1. The process for making a textile-bonded-to-textile product comprising applying to a surface of a textile fabric support about 5 to 100 g/m² of an adhesive composition consisting essentially of 100 parts by weight of polyethylene having a melt index of about 0.2 to 50 and a molecular weight of at least about 22,000, per about 5 to 45 parts by weight of a terpene resin having a softening point of about 60° to 120°C, placing the surface of said support carrying said adhesive composition on a textile fabric, and ironing said support for at least about 5 seconds at a temperature of about 120° to 160°C and a pressure of about 0.15 to 0.35 Kg/m² whereby bonding is effected.

* * * * *